Patented May 23, 1944

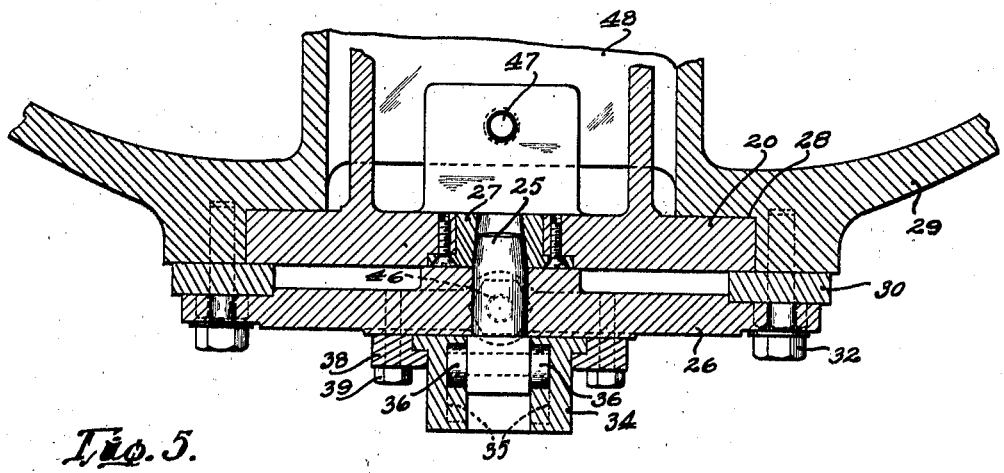
Fig. 5.
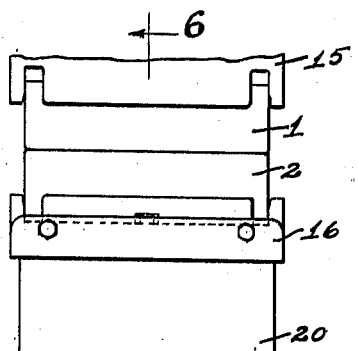
Fig. 4.
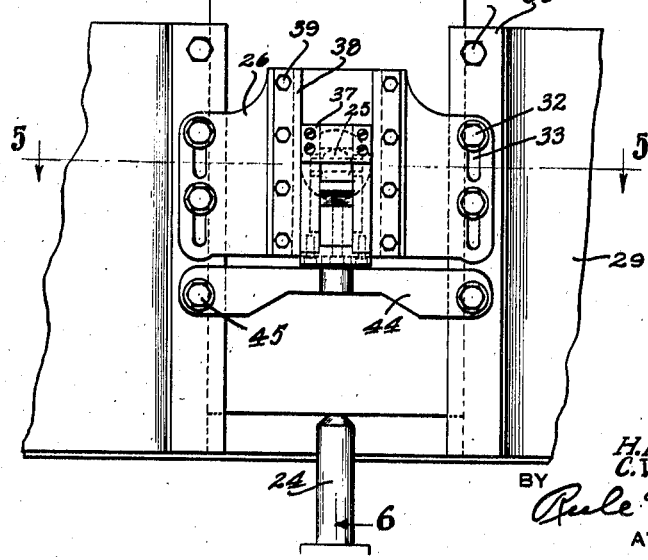

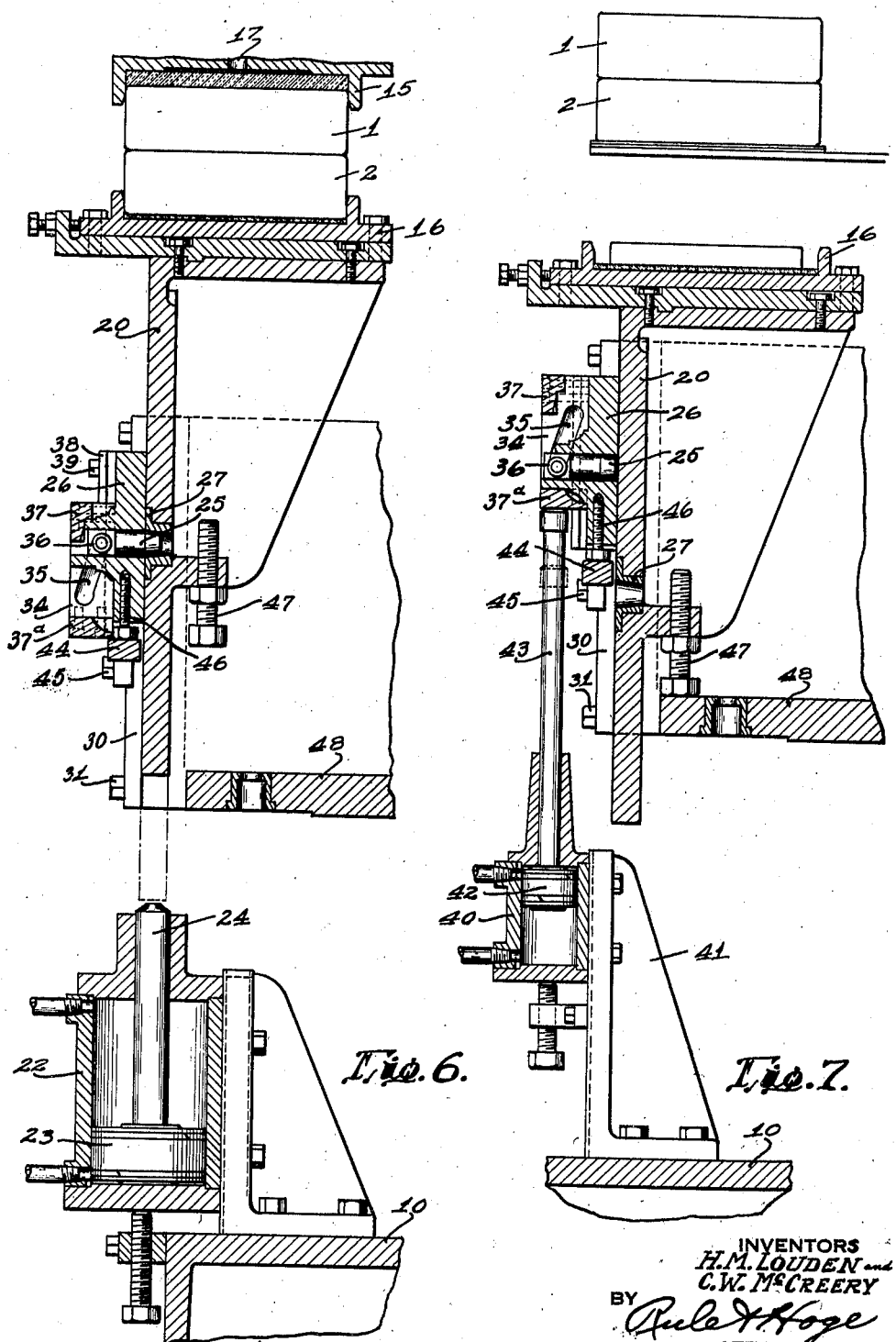

2,349,739

UNITED STATES PATENT OFFICE 2,349,739

PRESSURE SUSTAINING APPARATUS

Harry M. Louden and Cecil W. McCreery, Muncie, Ind., assignors to Owens-Illinois Glass Company, a corporation of Ohio Application October 7, 1941, Serial No. 414,000

11 Claims. (Cl. 49—1)

Our invention relates to automatic means for sustaining the pressure and relative position of two or more articles or parts of an article during the process of sealing or joining them together. The invention as herein illustrated is designed for use on a machine for sealing the two sections of a glass building block. The invention, however, is not limited to this particular use but may be employed in connection with the sealing together of various other parts or articles, or, more generally, for holding parts together for a certain length of time or during a cycle of operations.

However varied the design of any hollow article comprised of complemental members or parts to be sealed together, such parts of predetermined design usually possess meshing edges or flanges. These edges or flanges, following a preliminary heating or conditioning, may be fused or sealed by pressing together.

An object of the present invention is to provide automatic means to hold the parts accurately in register after they have been brought into register and a sealing pressure has been applied by any suitable means, such pressure being automatically transferred to sustaining members after the sealing pressure has been applied.

A further object of our invention is to provide, in connection with an automatic machine for sealing parts together, novel means for holding the parts together under pressure and maintaining accurate alignment or register of the parts in a manner to obtain extreme accuracy and uniformity in the successive units or articles being manufactured.

A further object of our invention is to provide in a sealing machine suitable means, comprising sustaining devices on the machine, for increasing the time cycle of applied sealing pressure and maintaining the parts in register throughout a partial, full or multiple cycle of machine operations.

A still further object of our invention is to provide practical means for broadening the range of the time intervals through which the sections of the work-piece are held under a sealing pressure, whereby the sealing operations may be adapted to the many variable factors encountered in practical operations, such as changes in temperature of equipment and preconditioning devices, atmospheric changes, drafts in the processing room, and the like.

Still another object of our invention is to embody the control features above indicated in a simple, direct, mechanically sound, positively operating, adjustable, integrated mechanism, readily adaptable to machine design.

A still further object of our invention is to provide a practical design of apparatus that will insure instant and positive transfer of sealing pressure from the means for applying such pressure to a sustaining device and at the same time maintain an accurate gauge and registration of the work-pieces.

Other objects of the invention will appear hereinafter.

Referring to the accompanying drawings which illustrate the invention as applied to a standard machine for sealing together the halves or sections of hollow glass blocks:

Fig. 4 is an elevation view showing the means for holding the halves of a block in sealing relation.

Fig. 5 is a section at the line 5—5 on Fig. 4.

Fig. 6 is a sectional elevation at the line 6—6 on Fig. 4 and additionally shows the piston motor for lifting the lower section of a block into sealing position.

Fig. 7 is a sectional elevation at the line 7—7 on Fig. 2, showing the means for releasing the slide through which pressure is maintained during the sealing operation.

Figure 1:
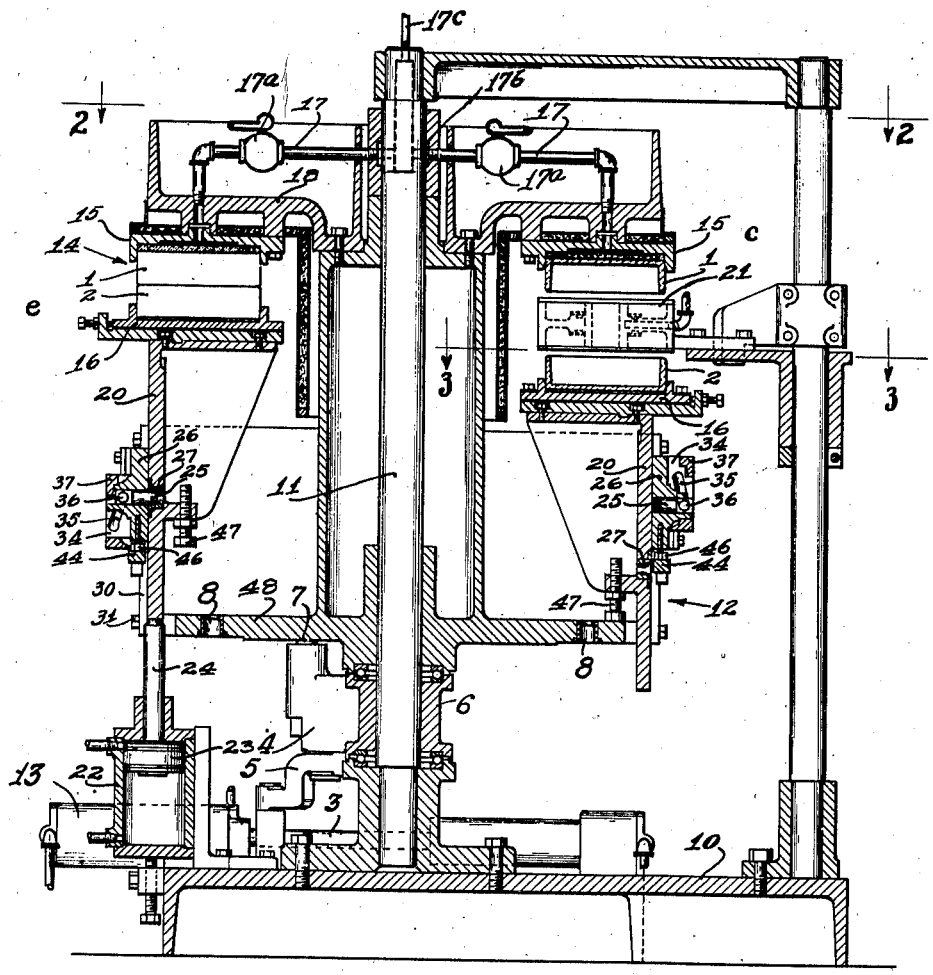
Fig. 1 is a sectional elevation of the machine at the line 1—1 on Fig. 2.
Figure 2:
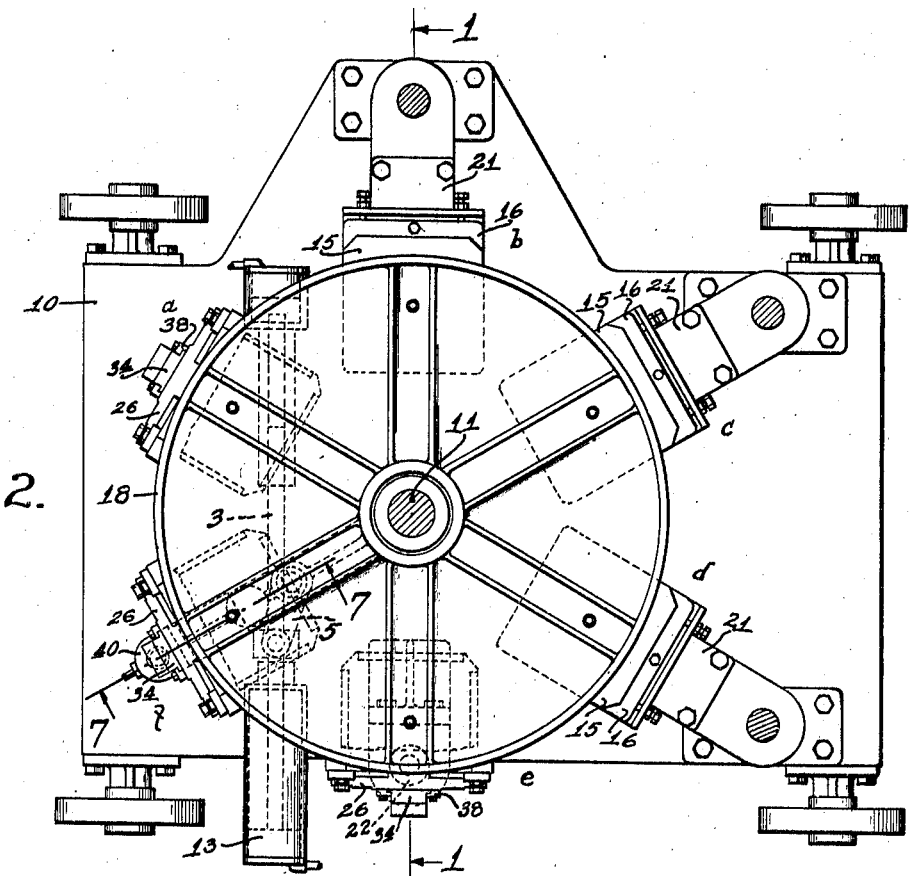
Fig. 2 is a sectional plan view at the line 2—2 on Fig. 1.
Figure 3:
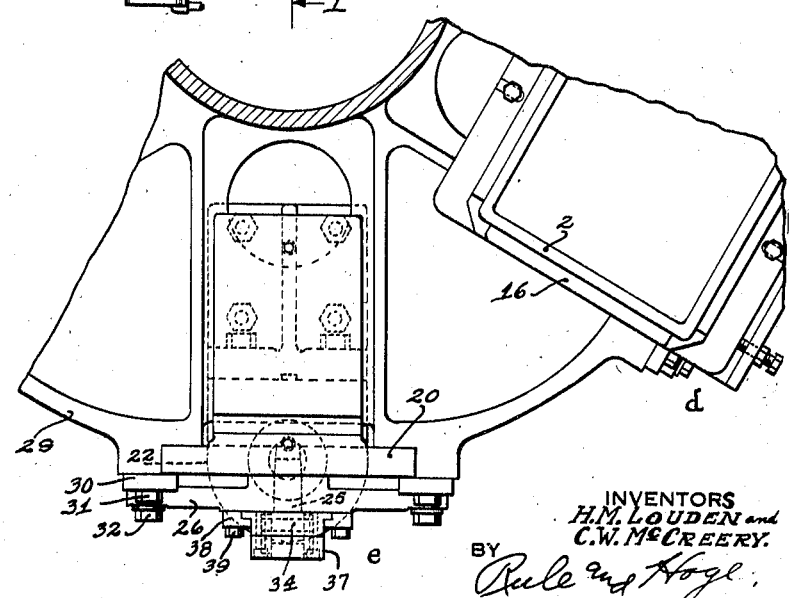
Fig. 3 is a fragmentary section on a larger scale at the line 3—3 on Fig. 1.

Referring particularly to Figs. 1 and 2, the machine comprises a base 10, a vertical center column 11 bolted thereon, and a carriage 12 mounted for rotation about the axis of the column 11. The carriage is intermittently rotated step by step by means of an air operated piston motor 13 for bringing each of a series of sealing units 14 to stations designated a, b, c, d, e and f in succession. The machine as shown is designed for sealing together the upper and lower halves or sections 1 and 2 of a hollow rectangular glass block.

Each unit 14 (Fig. 1) comprises holders in the form of chucks 15 and 16 adapted to hold the upper and lower sections 1 and 2 respectively. The upper sections may be held in their chucks by means of suction applied through suction pipes 17 individual to the chucks. The pipes 17 open into a distributing chamber 17ᵇ in communication with a suction line 17ᶜ. Each pipe is provided with a valve 17ᵃ which may be operated by hand to cut off the suction and release the vacuum and thereby release the block after the welding operation. The chucks 15 are carried on an upper plate or spider 18 forming part of the carriage. The lower chucks 16 are carried on slides 20 mounted for vertical sliding movement on the carriage as hereinafter described.

The block sections 1 and 2 are placed on the machine at the loading station a, the slide 20 at said station being in its lowered position. The indexing movements of the carriage bring the block to the several stations in succession. Burners 21 located at one or more stations, and as herein shown, located at stations b, c and d, apply heat to the surfaces of the block which are to be welded together, thereby rendering the surface portions sufficiently soft and plastic to permit a welding or sealing together of said surfaces which takes place at the station e at which the slide 20 is lifted. The sealed article may be removed at the take-out station f.

The slide 20 is lifted for bringing the block sections 1 and 2 together and applying a sealing pressure, by means of an air operated piston motor 22 (Figs. 1 and 6) at the station e. The motor 22 is mounted on the base 10 and comprises a piston 23 and a piston rod 24 beneath and in register with the slide 20.

When the motor 22 has operated to lift the slide, bringing the block sections 1 and 2 together and applying a sealing pressure thereto, the slide is automatically held in such position by pressure-sustaining means which will now be described. Such means includes a locking pin 25 mounted in a supporting plate 26 and formed with a tapered end to enter a bushing 27 in the slide 20. Said slide is mounted for vertical movement in guideways 28 formed in part by a cylindrical casting 29 which constitutes a part of the carriage 12. Gibs 30 secured to the casting 29 by means of bolts 31, cooperate with the casting 29 to form the guideways 28. The plate 26 (see Fig. 4) is mounted on the gibs 30 by means of bolts 32 and elongated slots 33 in said plate, permitting adjustment of the plate up and down. The locking pin 25 is mounted to slide freely lengthwise within the plate 26, under the control of cam rails 34 formed with cam grooves 35 in which run cam rolls 36 mounted on a pivot pin extending through the locking pin 25. The cam rails 34 are secured together by upper and lower cross-bars 37 and 37ᵃ which form with said rails a cam slide frame slidable freely up and down on the plate 26, being held to said plate by guide strips 38 attached to the plate 26 by bolts 39. The guide strips 38 are formed to provide with the plate 26 guideways for the cam slide frame.

While a slide 20 is in its lowered position, the locking pin 25 is in its retracted position. When the slide is moved upward by the motor 22 (Fig 6), bringing the locking pin 25 into line with the bushing 27, the pin is automatically projected into locking position by the cam slides 34 which are moved downward by their own weight. The slide 20 is in this manner securely locked in its upward position and sustained in such position independently of the lifting motor 22 so that the motor piston may be lowered preparatory to lifting the next succeeding slide.

Means for withdrawing the locking pin comprises a piston motor 40 (Figs. 2 and 7) which may be located at the take-out station f, said motor being mounted on a bracket 41 bolted to the machine base 10. The motor comprises a piston 42 to which is attached an upwardly extending piston rod 43 which registers with each cam slide frame as the latter is brought to rest at the take-out station. The motor is operated to move the rod 43 upward to full line position (Fig. 7), thereby camming the locking pin outwardly and releasing the slide 20. When the locking pin is thus retracted, the slide 20 is released and may be moved downward by gravity, carrying with it the welded block which may now be removed from the machine.

The cam slide frame, when it moves downward, is arrested by an anvil 44 in the path of the cross-bar 37ᵃ, said anvil being secured to the guide bars 30 by bolts 45. The plate 26 may be adjusted up and down by means of an adjusting screw 46 and then clamped in adjusted position by the bolts 32. This adjustment permits the height of the slide 20 to be adjustably varied to correspond to the vertical dimensions of the particular work-piece or block which is being welded. The slide 20 is supported in its lowered position by an adjustable stop bolt 47 which rests on the lower spider or floor 48 of the mold carriage.

The operation of the piston motors, including the motor 13 for indexing the carriage, the lifting motor 22, and the lock releasing motor 40, are under the control of a timer device (not shown) which may be of conventional construction, such as shown for example in the patent to Eastus, No. 2,244,291, June 3, 1941, Machine for aligning glass block sections and pressing them together. Under such control, the several motors are actuated in the required order of sequence and at the desired time intervals. The lock releasing motor 40 may be timed to withdraw the locking pin at any predetermined time interval, within rather wide limits, after the lifting motor has operated to effect sealing engagement of the block sections 1 and 2.

The motor 40 may be positioned at any one of a plurality of stations. In this manner there is provided means for varying the length of time the sealing pressure is maintained. When the lifting motor operates to lift a slide 20, bringing the sections 1 and 2 into sealing engagement, the locking pin operates instantaneously to lock the slide and sustain the sealing pressure and also to maintain accurate register of said sections during the time interval the slide is locked.

Modifications may be resorted to within the spirit and scope of our invention.

We claim:

1. The combination of holders for holding two work-pieces or sections which are to be welded together, means for heating the surfaces to be welded, a slide on which one of said holders is mounted, a motor operable to move said slide and thereby bring the work-pieces together and apply a welding pressure at said surfaces, a locking pin, and automatic means to project the locking pin into locking engagement with the slide and thereby maintain the said welding pressure independently of the motor.

2. The combination of holders for holding two work-pieces or sections which are to be welded together, means for heating the surfaces to be welded, a slide on which one of said holders is mounted, a motor operable to move said slide and thereby bring the work-pieces together and apply a welding pressure at said surfaces, a locking pin, automatic means to project the locking pin into locking engagement with the slide and thereby maintain the said welding pressure independently of the motor, and a second motor operable to withdraw said locking pin and release the slide.

3. The combination of a holder for a work-piece, a slide on which said holder is carried, said slide mounted for vertical movement, a motor for lifting the slide, a locking pin, means operable by gravity to project the locking pin into locking engagement with the slide, and means for withdrawing the locking pin.

4. The combination of a holder for a work-piece, a slide on which said holder is carried, said slide mounted for vertical movement, a motor for lifting the slide, a locking pin, a gravity operated cam operable automatically to project the locking pin into locking engagement with the slide and holding the latter in its lifted position independently of said motor, and means for releasing the locking pin.

5. A machine for welding together the sections of a glass article, said machine comprising a carriage mounted for rotation about a vertical axis, means on the carriage for holding said sections one over the other in spaced relation, a heating element arranged to heat the surfaces of the article which are to be welded together, a motor arranged to lift the lower of said sections into welding engagement with the upper section and apply a welding pressure to said sections, a pressure sustaining device mounted on the carriage for rotation therewith, and means for operating said device automatically and causing it to sustain said pressure independently of the said motor.

6. A machine for welding together the sections of an article, comprising a carriage, holders on the carriage for holding said sections one over the other with the sections spaced apart, means for heating the surfaces which are to be welded together, means for rotating the carriage step by step intermittently and thereby bringing the said sections to a plurality of stations in succession, a motor having a stationary mounting at one said station, means actuated by the motor for lifting the lower holder and bringing said sections together and applying a welding pressure, a locking device mounted on the carriage and operable automatically to lock said sections together and maintain said welding pressure independently of the motor, and automatic means for releasing the locking device.

7. A machine for welding together the sections of an article, comprising a carriage, holders on the carriage for holding said sections one over the other with the sections spaced apart, means for heating the surfaces which are to be welded together, means for rotating the carriage step by step intermittently and thereby bringing the said sections to a plurality of stations in succession, a motor having a stationary mounting at one said station, means actuated by the motor for lifting the lower holder and bringing said sections together and applying a welding pressure, a locking device mounted on the carriage and operable automatically to lock said sections together and maintain said welding pressure independently of the motor, said locking device comprising a locking pin and gravity operated means for projecting the pin into locking position, and a motor operable to release the locking pin, said last mentioned motor having a stationary mounting at a different station from said first mentioned motor.

8. A machine for welding together the sections of a hollow glass block, said machine comprising a carriage mounted for rotation about a vertical axis, a plurality of units arranged in an annular series about the axis of said motor, each said unit comprising an upper holder and a lower holder for holding the upper and lower sections respectively of said block, vertically movable slides on which said lower holders are carried, means for intermittently rotating the carriage step by step and thereby bringing each said unit to each of said stations in succession, burners located at certain of said stations in position to extend between the spaced sections of a said block and operable to heat to a welding temperature the surfaces which are to be welded together, a piston motor positioned at a station in advance of said burners and operable to lift each said slide in succession and thereby bring the sections of said blocks together and apply a welding pressure thereto, and automatic means individual to said slides for locking each slide in its lifted position when lifted by said motor and thereby maintaining the welding pressure independently of the motor and after the slide has passed beyond the motor.

9. A machine for welding together the sections of a hollow glass block, said machine comprising a carriage mounted for rotation about a vertical axis, a plurality of units arranged in an annular series about the axis of said motor, each said unit comprising an upper holder and a lower holder for holding the upper and lower sections respectively of said block, vertically movable slides on which said lower holders are carried, means for intermittently rotating the carriage step by step and thereby bringing each said unit to each of said stations in succession, burners located at certain of said stations in position to extend between the spaced sections of a said block and operable to heat to a welding temperature the surfaces which are to be welded together, a piston motor positioned at a station in advance of said burners and operable to lift each said slide in succession and thereby bring the sections of said blocks together and apply a welding pressure thereto, locking pins individual to said slides and mounted on the carriage, automatic means to project each locking pin into locking engagement with its slide while the latter is lifted by its motor, said projecting means including cams mounted for up and down movement and operable by gravity to project the locking pins into locking positions, and a motor for releasing the locking pins having a stationary mounting and operable automatically to lift said cams and thereby withdraw the locking pins.

10. In a machine for welding together the sections of an article, the combination of means for holding said sections in spaced relation, a motor, means operated by the motor for bringing said sections together and applying thereto a predetermined pressure, and automatic means brought instantaneously into position to sustain such pressure independently of the motor when said pressure is applied by the motor.

11. In a machine for welding together the sections of an article, the combination of means for holding said sections in spaced relation, a motor, means operated by the motor for bringing said sections together and applying thereto a predetermined pressure, a pressure sustaining device through which said pressure is transmitted from the motor to said sections, and automatic means operated instantaneously when said pressure is produced by the motor to lock said pressure sustaining device in position to maintain the pressure independently of the motor.

HARRY M. LOUDEN.
CECIL W. McCREERY.